March 12, 1963 W. C. WILEY ETAL 3,080,750
OSCILLATING MASS FLOWMETER
Filed Jan. 9, 1959

INVENTORS
WILLIAM C. WILEY
GEORGE W. GOODRICH
BY FRANK L. ADAMS
ATTORNEY

3,080,750
OSCILLATING MASS FLOWMETER
William C. Wiley, Northville, George W. Goodrich, Oak Park, and Franklin L. Adams, Inkster, Mich., assignors to The Bendix Corporation, a corporation of Delaware
Filed Jan. 9, 1959, Ser. No. 785,839
11 Claims. (Cl. 73—194)

This invention relates to a flowmeter for measuring the mass rate of fluid flow in fluid lines.

One embodiment of the flowmeter connects to the end of an open ended fluid line to measure the mass flow of the fluid discharged by the line. It includes an input section which is oscillated at constant frequency, preferably at resonance, and at constant peak amplitude to provide the fluid passing through the section with a rate of change of angular momentum. The amount of torque required to maintain the oscillation at constant frequency and amplitude provides an indication of the mass flow.

A second embodiment of the flowmeter connects into a continuing fluid line to measure the mass flow of the fluid passing through the line. It includes flexibly connected input and output sections having substantially the same resonant frequency and moment of inertia. The sections are oscillated in phase at constant frequency, preferably at resonance, and at constant peak amplitude to provide the fluid passing through the flowmeter with equal and opposite rates of change of angular momentum in the input and output sections. The difference in the torque applied to the input and output sections to maintain their in phase oscillation at constant frequency and amplitude provides an indication of the mass flow rate.

An object of this invention is to provide an improved mass flowmeter.

Another object of this invention is to provide a mass flowmeter which operates by imparting oscillatory motion to the fluid being measured.

Other objects and advantages will become apparent from the following detailed description and from the appended claims and drawings.

Figure 1:
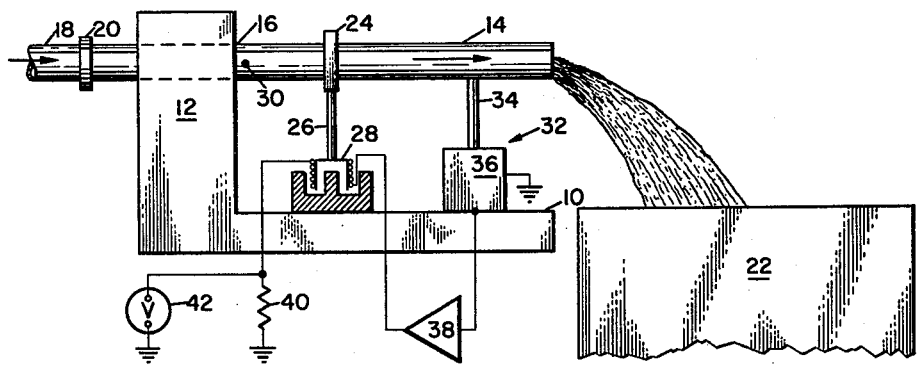
FIGURE 1 is a plan view of a mass flowmeter representing a first embodiment of this invention.

In the embodiment of FIGURE 1, a support member 10 of relatively heavy mass is provided with an upright portion 12. A pipe 14 is disposed through an opening 16 in the upright 12 and is fixedly retained in the opening. One end of the pipe 14 is connected to the open end of a fluid line 18 by means of a coupling 20 and the opposite end of the pipe is open to discharge fluid into an open vessel 22.

A clamp 24 is provided around the pipe 14. A rod 26, attached to a driver, such as a speaker 28, is connected to the clamp 24. The speaker 28 is securely attached to the member 10. When electrical energy is supplied to the speaker 28, the rod 26 is actuated so as to cause the pipe 14 to oscillate. The oscillatory motion of the pipe 14 occurs about an axis at substantially the position 30 in FIGURE 1, which axis is substantially perpendicular to the pipe.

A detector generally indicated at 32 is mounted between the pipe 14 and the member 10 to detect the oscillatory movements of the pipe. The detector 32 may include an armature 34 attached to the pipe 14 for movement relative to an electric coil in a housing 36 to produce a voltage having an amplitude proportional to the amount of displacement of the armature relative to the coil and a polarity dependent upon the direction of displacement. The detector 32 introduces its output to an amplifier 38 which in turn introduces its output to the input of the speaker 28. The ouput of the speaker 28 is connected to ground through a resistance 40 and also through a voltmeter 42 which provides an indication of the mass rate flow of fluid in the line 18) as will be hereinafter disclosed in detail.

When fluid is made to flow through the flowmeter in the direction of the arrows in FIGURE 1 and the pipe 14 is oscillated at constant frequency, preferably at resonance, and at constant peak amplitude about the axis 30, a rate of change of angular momentum is imparted to the fluid passing through the pipe. Since the fluid flow in the pipe 14 is radially outward from the axis 30, the rate of change of angular momentum developed is in a direction to increase the amount of torque required to maintain the oscillation of the pipe 14 at its resonant frequency and at constant peak amplitude.

The torque required to oscillate the pipe 14 in this manner can be expressed by the following equation.

$$T_{14}=I\ddot{\theta}+R^2W\dot{\theta}+b\dot{\theta}+K\theta \tag{1}$$

where $I$ = moment of inertia of the pipe 14 about the axis 30
$\theta$ = angular displacement of the pipe 14 about the axis 30
$\dot{\theta}$ = angular velocity
$\ddot{\theta}$ = angular acceleration
$R$ = radial length of pipe 14 from the axis 30 to the open end of the pipe
$K$ = spring constant of pipe 14
$b$ = coefficient of damping of pipe 14
$W$ = mass flow = $A\dot{r}d$
$A$ = cross sectional area of pipe 14
$\dot{r}$ = velocity of element of fluid of radius "$r$" from the axis 30
$d$ = density of the fluid Since at resonance $I\ddot{\theta}=-K\theta$, Equation 1 may be written as follows:

$$T_{14}=R^2W\dot{\theta}+b\dot{\theta} \tag{2}$$

Therefore the mass flow of the fluid would be $$W=\frac{T_{14}-b\dot{\theta}}{R^2\dot{\theta}} \tag{3}$$

Since the maximums of the alternating values of $2R^2\dot{\theta}$ and $b\dot{\theta}$ remain substantially constant, Equation 3 may be expressed as:

$$W=\frac{T_{14}-C_1}{C_2} \tag{4}$$

where $C_1$ and $C_2$ are constants clearly showing the torque applied to the pipe 14 provides an indication of the mass flow of the fluid.

In the operation of the mass flowmeter as shown in FIGURE 1, the circuit including the detector 36, the amplifier 38, the speaker 28 and the resistance 40 is a closed loop, regenerative circuit. The pipe 14 serves as its resonant element. The circuit, upon closure, operates to continuously drive the pipe 14 at its resonant frequency and at constant peak amplitude for any mass flow. The oscillation of the pipe 14 moves the armature 34 relative to the coil in the housing 36 to produce a voltage proportional to the movement and of a polarity dependent upon the direction of movement. This voltage is fed to the amplifier 38 for amplification and subsequent introduction to the speaker 28 to drive the pipe 14. As is evident from Equation 4 above, the torque required to maintain the oscillation of the pipe 14 varies directly with the mass flow. Therefore, the current in the regenerative circuit and the voltage across the resistance 40 would also vary directly with the mass flow since the torque produced by the speaker 28 is directly proportional to the current flow through the speaker.

Since the voltage across the resistance 40 is a measure of the torque applied to the pipe 14, the output of the voltmeter 42 is a measure of the mass flow of the fluid. The voltmeter 42 may be calibrated to provide direct readings of the mass flow.

Figure 2:
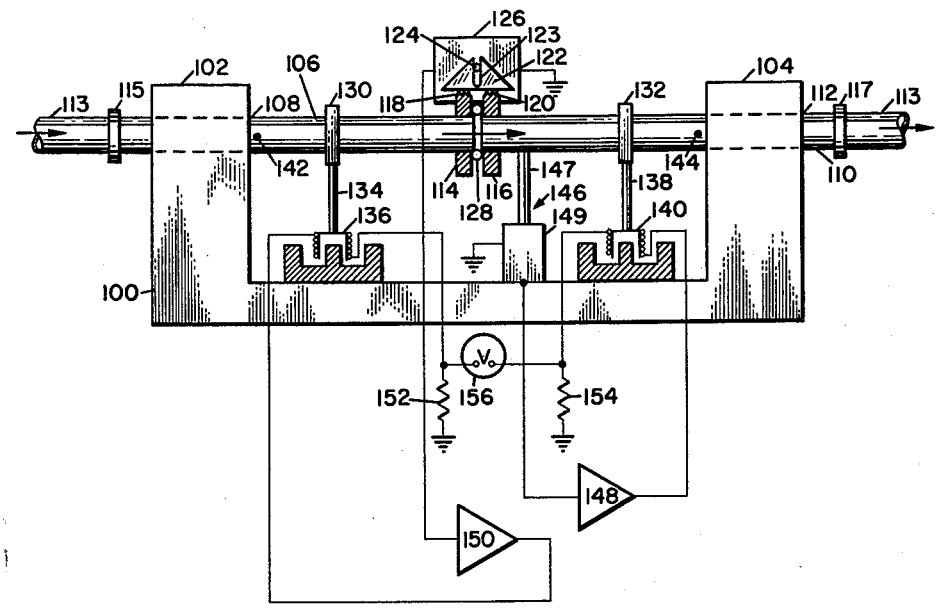
FIGURE 2 is a plan view of a mass flowmeter representing a second embodiment of this invention.

In the embodiment of FIGURE 2, a support member 100 of relatively heavy mass is provided with two upright portions 102 and 104. An input pipe 106 is disposed through an opening 108 in the upright portion 102 and is fixedly retained in the opening. Similarly, an output pipe 110 made of the same material and having the same diameter as the pipe 106 is disposed through an opening 112 in the upright portion 104 and is fixedly retained in the opening. The lengths of pipes 106 and 110 between their inner ends and the uprights 102 and 104, respectively, are made substantially the same. The outer ends of the pipes 106 and 110 are connected into a fluid line 113 by means of couplings 115 and 117, respectively.

Flanges 114 and 116 are provided at the inner ends of the pipes 106 and 110 facing each other. The flanges 114 and 116 are provided with knurls 118 and 120 upon which is disposed a triangular member 122 having a slot 123. Positioned in the slot 123 is a needle 124 of a magnetic pickup device 126. A relative displacement between the pipes 106 and 110 causes a rotation of the member 122 and the slot 123 thus producing a corresponding movement of the needle 124 and a voltage output from the device 126 having an amplitude proportional to the amount of displacement and a polarity dependent upon the direction of the displacement.

An O ring 128 is pressed between the flanges 114 and 116 to provide a fluid seal. Clamps 130 and 132 are provided around the pipes 106 and 110, at substantially the same distances from the uprights 102 and 104, respectively. A rod 134, attached to a driver, such as a speaker 136, is connected to the clamp 130 and a rod 138, attached to a driver, such as a speaker 140, is connected to the clamp 132. The speakers 136 and 140 are securely attached to the support member 100. When electrical energy is supplied to the speakers 136 and 140, the rods 134 and 138 are actuated so as to cause the pipes 106 and 110 to oscillate. The oscillatory motion of the pipes 106 and 110 occurs about axes at substantially positions 142 and 144 in FIGURE 2, which axes are substantially perpendicular to the pipes.

A detector generally indicated at 146 is mounted between the member 100 and the pipe 110 to detect the oscillatory movements of the pipe. The detector 146 may include an armature 147 attached to the pipe 110 for movement relative to an electric coil in a housing 149 to produce a voltage having an amplitude proportional to the amount of displacement of the armature relative to the coil and a polarity dependent upon the direction of displacement. The detector 146 introduces its output to an amplifier 148 which in turn introduces its output to the input of the speaker 140. The output of the device 126 is connected to the input of an amplifier 150 having its output connected to the input of the speaker 136. The outputs of the speakers 136 and 140 are connected to ground through resistances 152 and 154, respectively, having substantially the same resistance value and a voltmeter 156 is connected between the resistances to provide an indication of the mass rate flow of fluid in the line 113 as will be hereinafter disclosed in detail.

The lengths of pipes 106 and 110 between their inner ends and the uprights 102 and 104, respectively, are made the same so that they will have substantially the same resonant frequency and moment of inertia. When the fluid is not flowing through the flowmeter, the pipes 106 and 110 will oscillate in phase and at the same amplitude upon actuation by the speakers 136 and 140. In this condition, the knurls 118 and 120 on the flanges 114 and 116 will remain undisplaced relative to each other thus preventing any rotation of the member 122 or movement of the needle 124. The voltage output of the device 126 therefore remains zero.

When fluid is made to flow through the flowmeter in the direction of the arrows in FIGURE 2, the oscillation of the pipe 106 about the axis 142 imparts a rate of change of angular momentum to the fluid and the oscillation of the pipe 110 about the axis 144 imparts an opposite rate of change of angular momentum to the fluid. Since the fluid flow in the input pipe 106 is radially outward from the axis 142, this increases the amount of torque required to maintain the oscillation of the pipe 106. However, the amount of torque required to maintain the oscillation of the pipe 110 is decreased because the fluid flow in the pipe is radially inward towards the axis 144.

The torques required to oscillate the pipes 106 and 110 in phase at constant frequency, preferably at resonance, and at constant peak amplitude may be expressed by the following equations.

$$T_{106} = I\ddot{\theta} + R^2 W \dot{\theta} + b\dot{\theta} + K\theta \tag{5}$$

and $$T_{110} = I\ddot{\theta} - R^2 W \dot{\theta} + b\dot{\theta} + K\theta \tag{6}$$

where $I$ = moment of inertia of the pipes 106 and 110 about their respective axes 142 and 144
$\theta$ = angular displacement of the pipes 106 and 110 about their respective axes 142 and 144
$\dot{\theta}$ = angular velocity
$\ddot{\theta}$ = angular acceleration
$R$ = radial length of pipe 106 and 110 from their inner ends to their respective axes 142 and 144
$K$ = spring constant of pipes 106 and 110
$b$ = coefficient of damping of pipes 106 and 110
$W$ = mass flow = $A\dot{r}d$
$A$ = cross sectional area of pipes 106 and 110
$\dot{r}$ = velocity of element of fluid at radius "$r$" from the axes 142 and 144
$d$ = density of the fluid The values of I, $\theta$, $\dot{\theta}$, $\ddot{\theta}$, R, K, $b$ and A are the same for both pipes 106 and 110 since the pipes are made identical.

Since at resonance $I\ddot{\theta} = -K\theta$, Equations 5 and 6 may be written as follows:

$$T_{106} = R^2 W \dot{\theta} + b\dot{\theta} \tag{7}$$

and $$T_{110} = -R^2 W \dot{\theta} + b\dot{\theta} \tag{8}$$

Subtracting $T_{110}$ from $T_{106}$ we have $$T_{106} - T_{110} = 2R^2 W \dot{\theta} \tag{9}$$

Therefore, the mass flow of the fluid would be $$W = \frac{T_{106} - T_{110}}{2R^2 \dot{\theta}} \tag{10}$$

Since the maximum of the alternating value of $2R^2\dot{\theta}$ remains substantially constant, Equation 10 may be expressed as $$W = \frac{T_{106} - T_{110}}{C}$$

where $C = 2R^2\dot{\theta}$ clearly showing that the difference of the torques applied to pipes 106 and 110 provides an indication of the mass flow of the fluid.

In the operation of the mass flowmeter as shown in FIGURE 2, the circuit including the detector 146, the amplifier 148, the speaker 140 and the resistance 154 is a closed loop, regenerative circuit. The pipe 110 serves as its resonant element. The circuit, upon closure, operates to continuously drive the pipe 110 at its resonant frequency and at constant peak amplitude for any mass flow. The oscillation of the pipe 110 moves the armature 147 relative to the coil in the housing 149 to produce a voltage proportional to the movement and of a polarity dependent upon the direction of movement. The voltage is fed to the amplifier 148 for amplification and subsequent introduction to the speaker 140 to drive the pipe 110. As is evident from Equation 8 above, the torque required to maintain the oscillation of the pipe 110 varies inversely with the mass flow. Therefore, the current in the regenerative circuit and the voltage across the resistance 154 would also vary inversely with the mass flow since the torque produced by the speaker 140 is directly proportional to the current flow through the speaker.

When the pipe 110 is oscillated, it becomes displaced relative to the pipe 106. This results in a displacement of the knurls 120 relative to the knurls 118 thus causing a rotation of the member 122 and its slot 123, a corresponding movement of the needle 124 and a voltage output from the device 126 proportional to the amount of displacement between the pipes 106 and 110. The output of the device 126 is amplified by the amplifier 150 and introduced to the speaker 136 for driving the pipe 106 in a direction to reduce to zero the relative displacement between the pipes 106 and 110. In this way the pipe 106 is driven in phase with the pipe 110 and at the same amplitude. As is evident from Equation 7 above, the torque required to maintain the oscillation of the pipe 106 varies directly with the mass flow. Therefore, the current through the speaker 136 and voltage across the resistance 152 also vary directly with the mass flow since the torque produced by the speaker 136 is directly proportional to the current through the speaker.

Since the voltages across the resistances 152 and 154 are a measure of the torques applied respectively to the pipes 106 and 110, the output of the voltmeter 156 is a measure of the difference of these torques or a measure of the mass flow of the fluid as borne out by Equation 10 above. The voltmeter 156 may be calibrated to provide direct readings of the mass flow.

This invention has several advantages over present mass flowmeters. Since the mass flow reading is entirely independent of the temperature and pressure of the fluid, there is no need to compensate for pressure and temperature as is necessary in the case of certain flowmeters in present use. Also, the present invention eliminates the use of rotating fluid seals and constant rotary drives as are used in the so-called "Coriolis" mass flowmeters.

Furthermore, the present invention makes possible a straight line configuration which does not distort the fluid flow path as do present flowmeters such as the Coriolis type in which the fluid flows through a rotating U-shaped tube or a rotating impeller. Another advantage of the oscillating flowmeter disclosed above is that it operates with minimum power requirements when its elements are oscillated at resonance.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A mass flowmeter for measuring the mass rate of flow in a fluid line, including, a pipe connected at one end of the fluid line for receiving fluid from the line and for discharging the fluid at its other end, said other end being adapted to be oscillated as said fluid is discharged therefrom, said other end being open to freely discharge fluid therefrom, means for applying a torque to the pipe to oscillate it about an axis substantially transverse to said flow, means to sense the amplitude of vibration of said pipe, means connected to said last means and the means for applying a torque to said pipe to adjust the torque to said pipe to maintain said amplitude in a constant manner, and means to measure the torque applied to said pipe.

2. A mass flow meter for measuring the mass rate of flow in a fluid line, including, a pipe connected at one end to the fluid line for receiving fluid from the line and for discharging the fluid at its other end, said other end being adapted to be oscillated as said fluid is discharged therefrom, said other end being open to freely discharge fluid therefrom, means for applying a torque to the pipe to oscillate it about an axis substantially transverse to said flow at substantially its resonant frequency, means to sense the amplitude of vibration of said pipe, means connected to said last means and the means for applying a torque to said pipe to adjust the torque to said pipe to maintain said amplitude in a constant manner, and means to measure the torque applied to said pipe.

3. A mass flowmeter for measuring the mass rate of flow in a fluid line, including, first and second pipes joined with a flexible coupling and connected into the fluid line, means for applying a first torque to the first pipe to oscillate the pipe about an axis substantially transverse to said flow at substantially constant frequency and amplitude, means for applying a second torque to the second pipe to oscillate the pipe about an axis substantially transverse to said flow in phase with the first pipe and at the same amplitude, and means for measuring the difference between the first and second torques to provide an indication of the mass rate of fluid flow through the pipes.

4. A mass flowmeter as recited in claim 3 wherein the first and second pipes are of straight line configuration and are aligned with the fluid line so as to prevent any distortion in the fluid flow path.

5. A mass flowmeter for measuring the mass rate of flow in a fluid line, including, input and output pipes joined with a flexible coupling and connected into the fluid line, the input and output pipes having substantially the same resonant frequency and substantially the same moment of inertia, means for applying a first torque to the output pipe to oscillate the pipe about an axis substantially transverse to said flow at the resonant frequency and at a constant amplitude, means for applying a second torque to the input pipe to oscillate the pipe about an axis substantially transverse to said flow in phase with the output pipe and at the same constant amplitude, and means for measuring the difference between the first and second torques to provide an indication of the mass rate of fluid flow through the pipes .

6. A mass flowmeter as recited in claim 5 wherein the input and output pipes are of straight line configuration and are aligned with the fluid line so as to prevent any distortion in the fluid flow path.

7. A mass flowmeter for measuring the mass rate of flow in a fluid line, including, input and output pipes joined with a flexible coupling and connected into the fluid line, the input and output pipes having substantially the same resonant frequency and moment of inertia, means for applying first and second torques to the input and output pipes respectively to oscillate the pipes about an axis substantially transverse to said flow in phase at the resonant frequency and at the same amplitude during the flow of fluid through the pipes, and means for measuring the difference between the first and second torques to provide an indication of the mass rate of fluid flow.

8. A mass flowmeter for measuring the mass rate of flow in a fluid line, including, an input section connected to the fluid line to receive fluid from the line, an output section flexibly joined to the input section to receive the fluid from the input section and connected to the fluid line to return the fluid to the line, the input and output sections having substantially the same resonant frequency and moment of inertia, means for applying first and second torques to the input and output sections respectively to oscillate the sections about an axis substantially transverse to said flow relative to the fluid line, the sections being oscillated in phase at the resonant frequency and at the same amplitude during the flow of fluid through the sections, and means for measuring the difference between the first and second torques to provide an indication of the mass rate of fluid flow.

9. A mass flowmeter as recited in claim 8 wherein the input and output sections are of straight line configuration and are aligned with the fluid line so as to prevent any distortion of the fluid flow path.

10. A mass flowmeter for measuring the mass rate of flow in a fluid line, including, input and output pipes joined with a flexible coupling and connected into the fluid line, the input and output pipes having substantially the same resonant frequency and moment of inertia, a first driver connected to the output pipe for applying a first torque to the pipe to oscillate the pipe relative to the fluid line at its resonant frequency, a first sensor connected to the output pipe for producing an output proportional to the movement of the pipe, the output of the sensor being introduced to the driver as feedback so as to maintain the oscillation of the pipe at its resonance frequency, a second driver connected to the input pipe for applying a second torque to the pipe to oscillate the pipe relative to the fluid line in phase with the output pipe and at the same amplitude, a second sensor disposed to detect any relative displacement between the input and output pipes during their oscillation and operative to produce an output proportional to the displacement, the output of the second sensor being introduced to the second driver as feedback to reduce to zero any such displacement, and means for measuring the difference between the first and second torques to provide an indication of the mass rate of fluid flow.

11. A mass flowmeter as recited in claim 10 wherein the input and output pipes are of straight line configuration and are disposed in alignment with the fluid line to prevent any distortion of the fluid flow path.

References Cited in the file of this patent
UNITED STATES PATENTS

| | | |
|---|---|---|
| 2,635,462 | Poole et al. | Apr. 21, 1953 |
| 2,865,201 | Roth | Dec. 23, 1958 |
| 2,889,702 | Brooking | June 9, 1959 |
| 2,943,476 | Bernstein | July 5, 1960 |